(12) United States Patent
Hart

(10) Patent No.: US 6,691,981 B1
(45) Date of Patent: Feb. 17, 2004

(54) GATE VALVE

(76) Inventor: Robert Hart, 14 Pinders Grove, Wakefield (GB), WF1 4AH ( * ) Notice: Subject to any disclaimer, the term of this patent is extended or adjusted under 35 U.S.C. 154(b) by 0 days.

(21) Appl. No.: 09/720,143

(22) PCT Filed: Jun. 18, 1999

(86) PCT No.: PCT/GB99/01935

§ 371 (c)(1), (2), (4) Date: Feb. 27, 2001

(87) PCT Pub. No.: WO99/66237

PCT Pub. Date: Dec. 23, 1999

(30) Foreign Application Priority Data

Jun. 19, 1998 (GB) .............................................. 9813172

(51) Int. Cl.⁷ ................................................. F16K 3/04
(52) U.S. Cl. ......................................... 251/302; 74/63
(58) Field of Search ................................ 257/298, 301, 257/302, 203; 74/63, 69

(56) References Cited

U.S. PATENT DOCUMENTS

| | | | | |
|---|---|---|---|---|
| 316,913 A | * | 4/1885 | Prunty .......................... | 251/301 |
| 917,970 A | | 4/1909 | Smith | |
| 1,006,084 A | | 10/1911 | Hanley | |
| 1,404,028 A | * | 1/1922 | Jones .......................... | 251/301 |
| 1,798,952 A | | 3/1931 | Pellegrino | |
| 1,951,121 A | * | 3/1934 | Babcock ....................... | 251/304 |
| 1,969,375 A | * | 8/1934 | Laurent ....................... | 251/192 |
| 2,254,268 A | * | 9/1941 | Church ........................ | 251/192 |
| 2,450,128 A | | 9/1948 | Gemmell | |
| 2,805,836 A | | 9/1957 | Taylor | |
| 2,812,153 A | | 11/1957 | Westling | |
| 2,925,247 A | | 2/1960 | Fletcher | |
| 2,952,437 A | * | 9/1960 | Knox .......................... | 251/302 |
| 3,232,578 A | | 2/1966 | Cousins | |
| 3,325,141 A | * | 6/1967 | Skendrovic ................. | 251/302 |
| 3,590,872 A | * | 7/1971 | Baity .......................... | 251/301 |
| 3,626,981 A | * | 12/1971 | Bauer-Nilsen ............. | 251/283 |
| 3,788,346 A | * | 1/1974 | Fitzgerald .................... | 251/302 |
| 3,913,408 A | * | 10/1975 | Moore .......................... | 74/63 |
| 3,924,832 A | * | 12/1975 | Babcock ....................... | 251/301 |
| 3,973,753 A | * | 8/1976 | Wheeler ....................... | 251/301 |
| 4,019,535 A | | 4/1977 | Buckethal | |
| 4,304,261 A | | 12/1981 | Forester | |
| 4,328,949 A | | 5/1982 | Oddenino | |
| 4,373,546 A | * | 2/1983 | Krakovsky ................... | 251/301 |
| 4,432,387 A | * | 2/1984 | Sims .......................... | 251/302 |
| 4,440,382 A | * | 4/1984 | Pruvot et al. ................ | 251/208 |
| 4,499,919 A | | 2/1985 | Forester | |
| 4,532,961 A | * | 8/1985 | Walton et al. ............... | 251/175 |
| 4,892,010 A | * | 1/1990 | Pottier et al. ............... | 74/63 X |
| 5,284,320 A | * | 2/1994 | Michael et al. .............. | 251/304 |
| 5,308,040 A | * | 5/1994 | Torres ......................... | 251/208 |

FOREIGN PATENT DOCUMENTS

| | | | |
|---|---|---|---|
| EP | 392383 | * | 10/1990 |
| GB | 193256 | | 2/1923 |
| GB | 267759 | | 3/1927 |
| GB | 345369 | * | 3/1931 |
| GB | 920710 | | 3/1963 |
| GB | 2277573 | * | 2/1994 |
| GB | 2300896 | | 11/1996 |
| JP | 5514348 | * | 1/1980 |
| WO | WO 93/01431 | | 2/1923 |

* cited by examiner

Primary Examiner—Gene Mancene
Assistant Examiner—Eric Keasel
(74) Attorney, Agent, or Firm—Kilpatrick Stockton LLP (57) ABSTRACT

A gate valve (2) comprising valve body (4, 6) and a gate element (8) movable to selectively interrupt a flow passage through the valve body (4, 6). The gate element (8) is supported for rotation in a correspondingly shaped recess (14) in the valve body (4, 6). In one embodiment rotation of the gate element (8) is effected by drive means comprising a first member (10) mounted for rotation in the valve body (4, 6) and a second member (12) mounted for rotation in the gate element (8), the first and second members (10, 12) being linked such that rotational movement of the first member (10) is translated into rotational movement of the gate element (8) by the second member (12). In an alternative embodiment rotation of the gate element (8) is effected by a toothed rack (82).

25 Claims, 6 Drawing Sheets

GATE VALVE

FIELD OF THE INVENTION

The present invention relates to a valve having a valve body and a gate element wherein the gate element is movable to interrupt a flow passage passing through the body.

BACKGROUND OF THE INVENTION

Typically in a valve of this general type, the gate element comprises a flat plate having a flow aperture therethrough. The plate is movable perpendicular to the flow passage between a first position where the flow aperture is in register with the flow passage, and a second position where the flow passage is out of register with the flow passage. This type of valve requires a cavity within the valve body to allow sufficient movement of the plate relative to the flow passage. It is possible that material can become lodged in the cavity and this can affect the performance of the valve. In extreme circumstances the build up of unwanted material can lead to the gate element becoming jammed thus rendering the valve inoperative. For example, in valves used in the oil industry waxy deposits and/or hydrate deposits can impede valve performance.

An alternative type of gate valve utilizes a gate element which is rotatable within the valve body about an axis parallel to the flow passage. By making the gate element circular and providing it in a correspondingly shaped circular cavity within the valve body, the free space in which material can accumulate is greatly reduced. Typically however, the gate element is required to be carried on a rotatable axle which is supported by, and projects into or through, the valve body. Examples of such valves can be seen in U.S. Pat. No. 917,970, U.S. Pat. No. 3,590,872, GB 2277573 and GB 2300896. This arrangement typically requires sealing means about the point through which the axle projects. Drive means are often coupled to the axle are also required to enable rotation of the gate member. The sealing and drive means increase the size, complexity and cost of the valve.

U.S. Pat. No. 5,284,320 describes a gate valve having a rotatable gate element. Rotation of the gate element is effected by an eccentrically rotatable pinion gear and an actuation gear surface provided in a cavity of the gate element. The gear surface has a cam shaped pitch line which co-operates with the eccentric movement of the pinion gear to rotate the gate element. This configuration requires the gate element to be constructed in two pieces comprising a first semicircular piece having a flow aperture therein, and a second semicircular piece having the actuation gear surface. Accurate machining is required to ensure an adequate fit between the pieces, and any imperfections in between the pieces can increase the friction between the gate element and the valve body. Furthermore, this type of valve requires a bush surrounding the gate element pieces to retain them in association with one another.

According to a first aspect of the present invention there is provided a valve comprising a valve body having a flow passage therethrough, a gate element having an orifice, and drive means to move the gate, wherein the gate is rotatably supported by a recess within the body and the valve body defines a pressure containing housing around the gate element.

By rotatably supporting the gate in the recess, the need for a shaft to carry the gate is eliminated. Accordingly the complexity of the valve is reduced. The overall size of the valve is also reduced making it suitable for applications where component size is an issue. An example of such an application is in the offshore oil industry where available space on oil platforms is limited. It is envisaged that a plurality of valves according to the present invention could be arranged together to provide, for example, a wellhead Christmas tree.

Preferably the gate element is disc shaped, and the recess is correspondingly shaped. In such an embodiment the free space between the gate element and the valve body is minimized and thus the possibility of material or debris lodging in the free space and consequently affecting the operation of the valve is reduced. The present invention also provides a gate element which rotates within a space substantially equal to its volume. In a conventional gate valve the gate element moves linearly within a cavity within the valve body, with the volume of the cavity being greater than that of the gate element. Debris can accumulate within the cavity when the gate element is in one position and can subsequently impede the gate element as it is moved to another position. The present invention seeks to eliminate the inherent disadvantages of having a cavity with a volume substantially greater than that of the gate element.

The drive means may be recessed in the valve body and or the gate element. In a preferred embodiment the drive means comprise a first member mounted for rotation in the valve body, and a second member mounted for rotation in the gate element, wherein the first and second members are linked such that rotational movement of the first member is transferred into rotational movement of the gate element by the second member.

In a preferred embodiment the first and second members are circular, and are mounted for rotation in correspondingly shaped recesses in the valve body and gate. In one embodiment the first member is provided with an eccentric pin and the second member is provided with an eccentric hole. Alternatively the first member may be provided with an eccentric hole and the second member with an eccentric pin.

In an alternative embodiment the drive means may comprise a rotatable member having an eccentric portion which is engageable in a slot provided in the gate element. The rotatable member may take the form of a disc having a pin extending from a face thereof. In an alternative embodiment the rotatable member may take the form of a cranked rod. In both cases, rotation of the rotatable member causes the eccentric portion thereof to bear against a wall of the slot and hence apply a drive force to the gate element. A sliding block or bush may be provided between the eccentric portion and the slot. The slot may be linear or curved.

In a further alternative embodiment the drive means may comprise a link member pivotally connected between the gate element and a rotatable member. In use, rotation of the rotatable member is translated into rotational movement of the gate element by the link member. In one embodiment, the rotatable member is in the form of a disc and the link member is pivotally connected eccentrically with respect to the disc.

In yet further embodiments the drive means may comprise a worm gear engageable with the gate element, or a toothed rack engageable with the gate element.

According to a second aspect of the present invention there is provided a drive mechanism for the rotatable gate of a valve, the drive mechanism comprising a first member mountable for rotation in a body of the valve, and a second member mountable for rotation in the gate, the first and second members being linkable such that rotational movement of the first member is transferred into rotational movement of the gate element by the second member.

Preferably the first and second members are circular, and are mounted for rotation in correspondingly shaped recesses in the valve body and gate. In one embodiment the first member is provided with an eccentric pin and the second member is provided with an eccentric hole. Alternatively the first member may be provided with an eccentric hole and the second member with an eccentric pin.

Preferably a drive shaft is provided to enable the first member to be rotated. Preferably the first member, the second member, and the gate are rotatable about axes which are mutually parallel.

According to a third aspect of the present invention there is provided a rotatable gate element for a valve, the gate element having an orifice and comprising a carrier member and two wedge members, the wedge members being carried by the carrier member, and each wedge member having opposing inclined wedge faces, wherein one of the wedge members is provided with a cam surface which, in use, is acted upon so as to move the wedge faces of the wedge members into contact with one another and hence move the wedge members relative to one another and outwardly with respect to the carrier member.

In a preferred embodiment the cam surface of the wedge member is acted upon by a corresponding cam surface provided on the body of the valve. Preferably the cam surfaces are caused to act upon one another by rotation of the gate element relative to the valve body. Preferably the outward movement of the wedge members urges the wedge members into contact with seats of the valve so as to ensure a leak tight seal between the seats and the gate element. The gate element is preferably disc shaped with the carrier member and wedge members being substantially semicircular.

The wedge members may be retained in association with the carrier member by means of pins or the like attached to each wedge member which pass through lugs of the carrier member.

BRIEF SUMMARY OF THE DRAWINGS

Embodiments of the present invention will now be described with reference to the accompanying drawings in which.

DETAILED DESCRIPTION OF PREFERRED EMBODIMENTS

Figure 1:
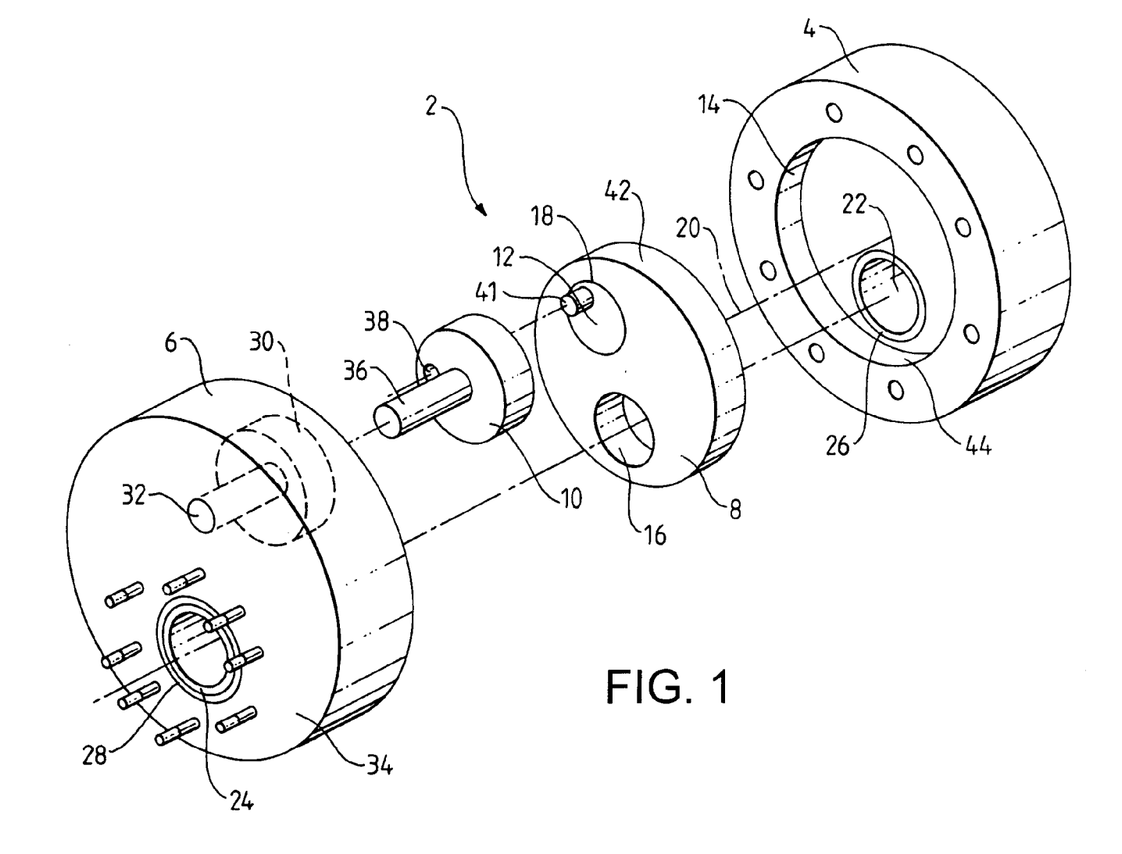
FIG. 1 shows an exploded perspective view of a valve according to a first embodiment of the present invention.

Referring firstly to FIG. 1 there is shown a valve 2 comprising a housing 4, an end cap 6, a gate 8, and actuation means including a drive wheel 10 and a compensator wheel 12. The gate 8 is substantially circular and is rotatably located within a correspondingly shaped recess 14 in the housing 4. In the embodiment shown the gate 8 is of single piece construction. The gate 8 and recess 14 are sized such that there is sufficient clearance between an outer wall 42 of the gate 8 and an inner wall 44 of the recess 14 to enable the gate 8 to rotate freely. The gate 8 has a circular gate aperture 16, and a circular recess 18 within which the compensator wheel 12 is received. The central axes of the gate aperture 16 and recess 18 are parallel to a notional axis 20 about which the gate 8 is rotatable within the recess 14. The housing 4 and end cap 6 are provided with apertures 22, 24 which, when the end cap 6 is attached to the housing 4, are axially aligned. In use, the aperture 16 in the gate 8 may be moved into and out of alignment with the apertures 22, 24 to control the flow of fluid through the valve 2. The apertures 22, 24 include annular valve seats 26, 28 which ensure a leak tight seal is made against the gate 8 when the apertures 16, 22, 24 are not aligned and fluid is not able to flow through the valve.). The gate 8 and faces of the valve seats 26, 28 which contact the gate may have a hardened coating, for example tungsten carbide. The valve seats 26, 28 may utilize fluid pressure in order to seal against the gate 8.

Referring firstly to FIG. 1 there is shown a valve 2 comprising a housing 4, an end cap 6, a gate 8, and actuation means including a drive wheel 10 and a compensator wheel 12. The gate 8 is substantially circular and is rotatably located within a correspondingly shaped recess 14 in the housing 4. In the embodiment shown the gate 8 is of single piece construction. The gate 8 and recess 14 are sized such that there is sufficient clearance between an outer wall 42 of the gate 8 and an inner wall 44 of the recess 14 to enable the gate 8 to rotate freely. The gate 8 has a circular gate aperture 16, and a circular recess 18 within which the compensator wheel 12 is received. The central axes of the gate aperture 16 and recess 18 are parallel to a notional axis 20 about which the gate 8 is rotatable within the recess 14. The housing 4 and end cap 6 are provided with apertures 22,24 which, when the end cap 6 is attached to the housing 4, are axially aligned. In use, the aperture 16 in the gate 8 may be moved into and out of alignment with the apertures 22,24 to control the flow of fluid through the valve 2. The apertures 22,24 include annular valve seats 26,28 which ensure a leak tight seal is made against the gate 8 when the apertures 16,22,24 are not aligned and fluid is not able to flow through the valve 2. The gate 8 and faces of the valve seats 26, 28 which contact the gate may have a hardened coating, for example tungsten carbide. The valve seats 26,28 may utilize fluid pressure in order to seal against the gate 8.

The end cap 6 is further provided with a circular recess 30 within which the drive wheel 10 is receivable for rotation. A hole 32 extends from the recess 30 to an outside surface 34 of the end cap 6. The drive wheel 10 includes a concentric shaft 36 and an eccentric pin hole 38 within which a pin 41 carried by the compensator wheel 12 can, in use, locate. The pin 41 is mounted eccentrically with respect to the axis about which the compensator wheel 12 is rotatable within the recess 18.

In use, the valve 2 is assembled with the end cap 6 fixed to the housing 4, and the shaft 36 projecting through the hole 32. The shaft 36 is connectable to drive means (not shown) which provide the force necessary to move the gate 8 and operate the valve 2. It will be understood that if the valve 2 were assembled with the components in the relative positions shown in FIG. 1 the gate aperture 16 would be aligned with the apertures 22,24.

Operation of the valve 2 will now be described with the relative terms clockwise and anticlockwise being construed as though the valve 2 were being viewed from the end cap 6 side. To close the valve 2 the gate 8 is required to be moved anticlockwise in order that the gate aperture 16 is moved out of alignment with the apertures 22,24. To achieve this the shaft 36, and hence the drive wheel 10, are rotated by the drive means. Rotational movement of the drive wheel 10 is translated into rotational movement of the gate 8 by the pin 41 and the compensator wheel 12. Relative movement between the compensator wheel 12 and the gate 8 ensures that the gate 8 rotates about the axis 20.

It will be appreciated that the close fit between the gate 8 and recess 14 mean that the gate 8 does not require the support of a central shaft or axle running in the housing 4 and/or end cap 6. This reduces the complexity of the valve 2 by removing the need for bearings and seals associated with a shaft supported gate. As the gate 8 substantially fills the recess 14 there exists little free space within the valve 2 in which foreign matter can collect. Further free space is eliminated by having the compensator wheel 12 running in the recess 18 provided in the gate 8 and the drive wheel 10 running in the end cap recess 30. As a consequence the overall size of the valve can be reduced.

Existing valves having shaft mounted gates typically require a torque to be applied to the shaft in order to rotate the gate. The central position of the shaft with respect to the valve casing may pose problems in the siting of drive means to apply said torque, and the drive means may require a link mechanism to connect to the shaft. It will be understood that the relative positions of the drive wheel 10, the compensator wheel 12 and the pin 41 enable the said components to, in effect, define a gear system. Consequently the diameters of the compensator and drive wheels 10, 12 and the relative position therebetween of the pin 41 can be chosen to, for example, minimize the torque required to be supplied by the drive means in order to rotate the gate.

Figure 2:
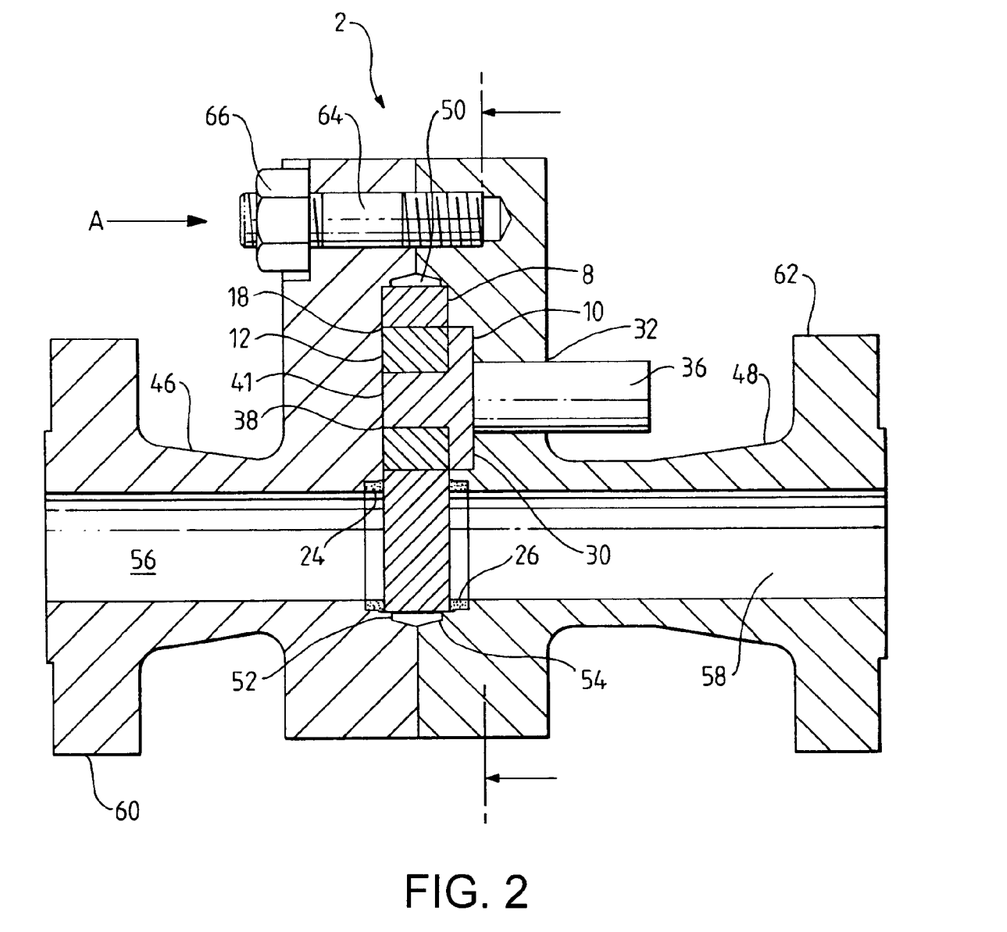
FIG. 2 shows a cross-sectional view of a valve according to a second embodiment of the present invention.
Figure 3:
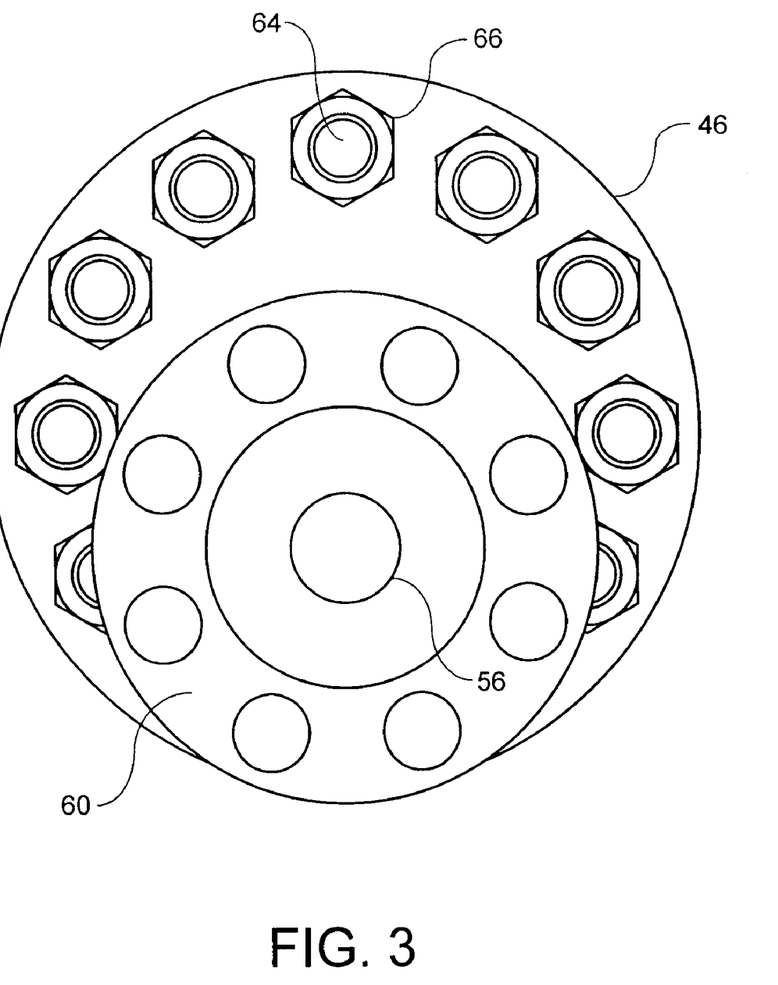
FIG. 3 shows an end view of the valve of FIG. 2 as indicated by arrow A.
Figure 4:
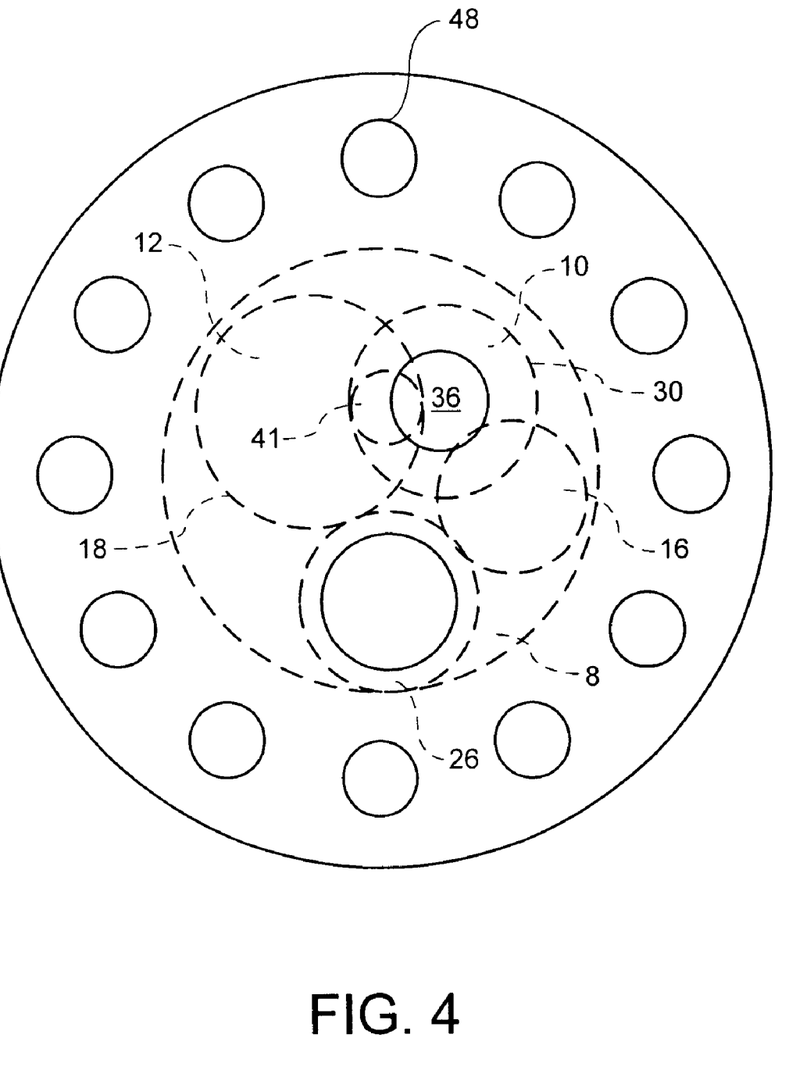
FIG. 4 shows the cross-sectional view of the valve in the direction indicated by B—B on FIG. 2.

Referring now to FIGS. 2 to 4 there is shown a second embodiment of a valve 2 according to the present invention. Components common to the valve 2 of FIG. 1 are identified with like numerals. The valve 2 comprises a two piece housing 46,48, a gate 8, a drive wheel 10, and a compensator wheel 12. The gate 8 is provided in a cavity 50 defined by opposing recesses 52,54 in the housing 46,48. Each housing component 46,48 has a flow passage 56,58, a flange 60,62, and a valve seat 24,26. The housing components 46,48 are joined by a plurality of spaced studs 64 and nuts 66. In the embodiment shown the drive wheel 10 is provided with the pin 41 and the compensator wheel 12 provided with the pin hole 38. This arrangement reduces the thickness of the drive wheel 10 and hence reduces the depth of the recess 30 required in the housing 48.

In the relative positions of the components shown in FIG. 4 the gate aperture 16 is out of alignment with the flow passages 56,58 and the valve 2 is closed. To open the valve 2 requires the gate 8 to be rotated clockwise (FIG. 4) to move the gate aperture 16 into alignment with the flow passages 56,58. This is achieved by rotating the drive wheel 10 clockwise. Such clockwise rotation of the drive wheel 10 results in clockwise rotation of the gate 8. To move the gate aperture 16 out of alignment with the flow passages 56,58 the drive wheel 10 is required to be rotated anticlockwise.

Figure 5:
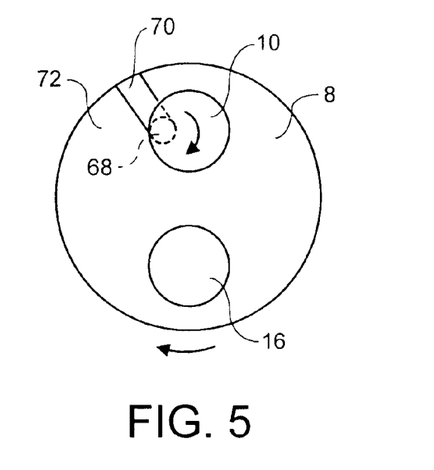
FIGS. 5 to 10 show diagrammatic representations of alternative embodiments of gate elements according to the present invention.
Figure 6:
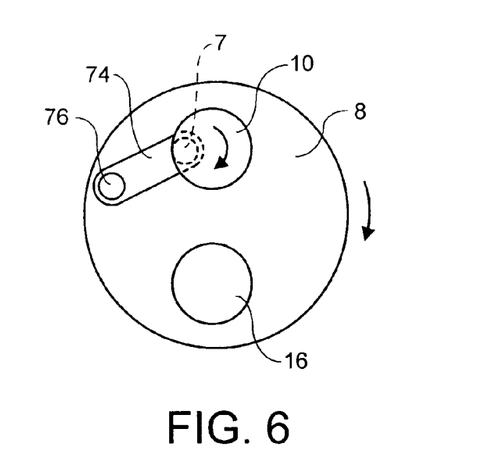

FIGS. 5 to 10 show alternative gate 8 configurations. The gate 8 of FIG. 5 is rotatable by means of a pin 68 which engages in a slot 70 provided in a face 72 of the gate 8. The pin 68 is carried by a drive wheel 10 which is rotatable in a correspondingly shaped recess in the valve housing. The gate 8 of FIG. 6 is rotatable by means of a link 74 located by pins 76,78 carried by the gate 8 and a drive wheel 10. To rotate the drive wheels 10, and hence the gates 8, of FIGS. 5 and 6 a shaft (not shown) is provided extending from a face of the drive wheels 10. It is envisaged that the arrangements shown in FIGS. 5 and 6 will enable the gate to be rotated by around 90 degrees.

Figure 7:
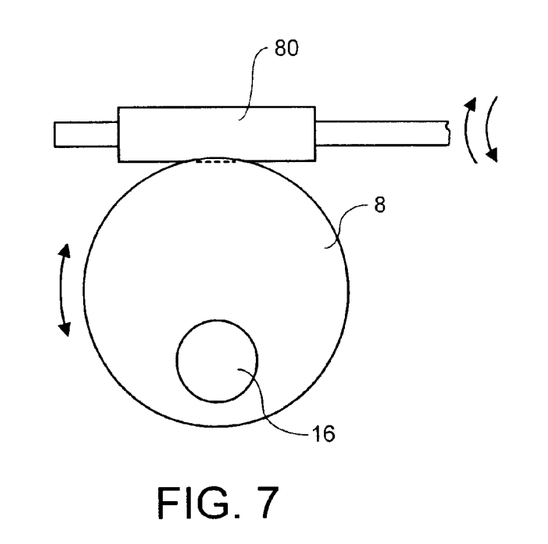
Figure 8:
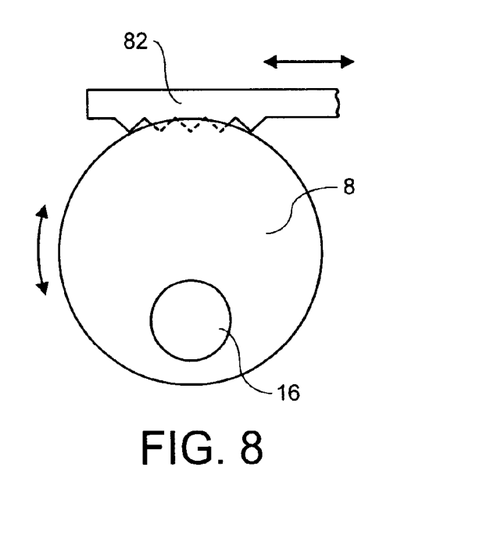

The gates 8 of FIGS. 7 and 8 are respectively rotatable by means of a worm gear 80 and a toothed rack 82. It will be understood that the outer edge 84 of the gate 8 is formed so as to engage the thread form of the worm gear 80 or the teeth on the rack 82. The rack 82 is movable in a linear manner to effect rotational movement of the gate 8. Thus a simple fluid actuator, such as a hydraulic or pneumatic ram, can be employed to move the gate 8.

Figure 9:
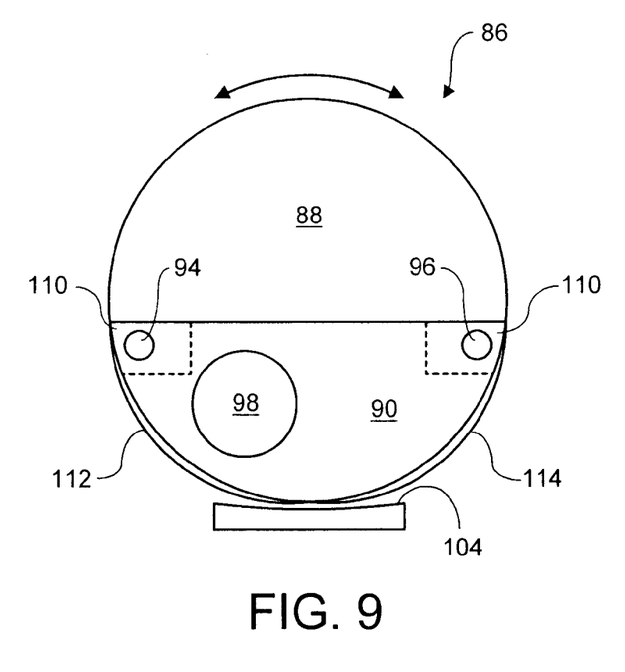
Figure 10:
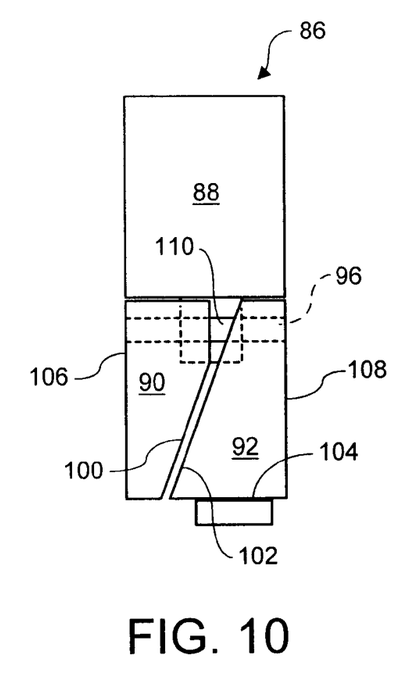

Referring finally to FIGS. 9 and 10 there is shown a diagrammatic representation of an embodiment of a split gate element 86 comprising a carrier segment 88 and split wedge segments 90, 92. The wedge segments 90, 92 are loosely connected to lugs 10 of the carrier segment 88 by pins 94, 96. A gate aperture 98 is provided through the wedge segments 90, 92. The wedge segments 90, 92 are provided with facing inclined wedge surfaces 100, 102. In the figure the gap between the wedge surfaces 100, 102 is exaggerated for the purposes of illustration. A cam surface 104 is provided adjacent one of the wedge segments 92 on the valve body within which the gate element 86 is contained. Corresponding cam surfaces 112,114 are provided on either side of one of the wedge segments 92.

In use, the cam surfaces 112,114 of the wedge segment 92 are movable into engagement with the valve body cam surface 104 when the gate 86 is rotated. The loose connection between the wedge segments 90,92 and the carrier segment 88 permits movement of the wedge segment 92 as a result of contact between the cam surfaces 104,112,114. Such movement of the wedge segment 92 moves the wedge surfaces 100, 102 into engagement with one another, with the result that the wedge segments 90, 92 move outwardly in relation to the carrier segment 88. In this manner outer faces 106, 108 of the wedge segments 90, 92 can be urged into contact with valve seats to ensure a leak tight seal. The provision of cam surfaces 112, 114 on either side of the wedge segment 92 enables the outer faces 106, 108 of the wedge segments 90,92 to be urged into contact with the valve seats when the gate is in both open and closed positions.

What is claimed is:

1. A valve comprising a valve body having a flow passage there through, a gate element having an orifice, and actuation means operable to move the gate element, wherein the gate element is supported for rotation by a first recess within the valve body and the valve body defines a pressure-containing housing around the gate element, wherein further the actuation means comprise a drive element rotatably supported by a second recess of the valve body, and a compensator wheel supported for rotation around an axis of rotation within a recess associated with the gate element, the drive element and compensator wheel being linked such that rotational movement of the drive element is transferred into rotational movement of the gate element by the rotation of the compensator wheel within the recess associated with the gate element.

2. A valve as claimed in claim 1 wherein the gate element is disc shaped.

3. A valve as claimed in claim 2 wherein the first recess is the same shape as the gate element.

4. A valve as claimed in claim 1 wherein the drive element and compensator wheel are circular, and are supported in correspondingly shaped said second recess and said recess associated with the gate element.

5. A valve as claimed in claim 1 wherein the valve body includes sealing means surrounding the flow passage and adapted to provide a leaktight seal against the gate element.

6. A valve as claimed in claim 1 wherein the drive element is provided with a drive shaft.

7. A valve as claimed in claim 6 wherein the drive shaft extends along an axis parallel to and spaced from a rotational axis of the gate element.

8. A valve as claimed in claim 6 wherein the drive shaft extends through an aperture in the valve body.

9. A valve comprising a valve body having a flow passage therethrough, a gate element having an orifice, and actuation means operable to move the gate element, wherein the gate element is supported for rotation by a first recess within the valve body and the valve body defines a pressure-containing housing around the gate element, wherein further the actuation means comprise a drive element rotatably supported by a second recess of the valve body, a compensator wheel rotatably supported by a recess associated with the gate element, the drive element and compensator wheel being linked such that rotational movement of the drive element is transferred into rotational movement of the gate element by the compensator wheel, and wherein the drive element is provided with an eccentric pin and the compensator wheel is provided with an eccentric hole.

10. A valve comprising a valve body having a flow passage therethrough, a gate element having an orifice, and actuation means operable to move the gate element, wherein the gate element is supported for rotation by a first recess within the valve body and the valve body defines a pressure-containing housing around the gate element, wherein further the actuation means comprise a drive element rotatably supported by a second recess of the valve body, a compensator wheel rotatable supported by a recess associated with the gate element, the drive element and compensator wheel being linked such that rotational movement of the drive element is transferred into rotational movement of the gate element by the compensator wheel, and wherein the drive shaft extends along an axis parallel to and spaced from a rotational axis of the gate element.

11. A valve comprising a valve body having a flow passage therethrough, a gate element having an orifice, and actuation means operable to move the gate element, wherein the gate element is supported for rotation by a first recess within the valve body and the valve body defines a pressure-containing housing around the gate element, wherein further the actuation means comprise a drive element rotatable supported by a second recess of the valve body, a compensator wheel rotatable supported by a recess associated with the gate element, the drive element and compensator wheel being linked such that rotational movement of the drive element is transferred into rotational movement of the gate element by the compensator wheel, and wherein the drive element is provided with an eccentric hole and the compensator wheel is provided with an eccentric pin.

12. A valve comprising a valve body having a flow passage therethrough, a gate element having an orifice, and actuation means operable to move the gate element, wherein the gate element is supported for rotation by a first recess within the valve body and the valve body defines a pressure-containing housing around the gate element, wherein further the actuation means comprise a first member rotatably supported by a second recess of the valve body, and a second member rotatably supported by a recess associated with the gate element, the first and second members being linked such that rotational movement of the first member is transferred into rotational movement of the gate element by the second member, and wherein the gate element comprises a carrier member and two wedge members, the wedge members being carried by the carrier member, and each wedge member having opposing inclined wedge faces, wherein one of the wedge members is provided with a cam surface which, in use, is acted upon to move the wedge faces of the wedge members into contact with one another and hence move the wedge members relative to one another and outwardly with respect to the carrier member.

13. A gate element as claimed in claim 12 wherein the cam surface of the wedge member is acted upon by a corresponding cam surface provided on the body of the valve.

14. A gate element as claimed in claim 13 wherein the cam surfaces are caused to act upon one another by rotation of the gate element relative to the valve body.

15. A gate element as claimed in claim 12 wherein the outward movement of the wedge members urges the wedge members into contact with seats of the valve so as to ensure a leak tight seal between the seats and the gate element.

16. A gate element as claimed in claim 12 wherein the wedge members are retained in association with the carrier member by means of pins attached to each wedge member which pass through lugs of the carrier member.

17. A gate element as claimed in claim 12 wherein the gate element is disc shaped with the carrier member and wedge members being semicircular.

18. A drive mechanism for a rotatable gate element of a valve, the actuation drive mechanism comprising a drive element supportable for rotation by a first recess of a body of the valve, and a compensator wheel supportable for rotation within a recess of the rotatable gate element around an axis of rotation within the recess, the drive element and the compensator wheel being operatively linked such that rotational movement of the drive element within the first recess is transferred into rotational movement of the gate element by the rotation of the compensator wheel within the recess of the sate element.

19. A drive mechanism as claimed in claim 18 wherein the drive element, the compensator wheel, and the gate element are rotatable about axes which are mutually parallel.

20. A drive mechanism as claimed in claim 18 wherein the drive elements and the compensator wheel are supportable for rotation in circular recesses in the valve body and the gate element, respectively.

21. A drive mechanism as claimed in claim 18 wherein the drive element is provided with a drive shaft.

22. A drive mechanism as claimed in claim 21 wherein the drive shaft extends through an aperture in the valve body.

23. A drive mechanism as claimed in claim 21 wherein the drive shaft extends along an axis parallel to and spaced from a rotational axis of the gate element.

24. A drive mechanism for a rotatable gate element of a valve, the actuation drive mechanism comprising a drive element supportable for rotation by a first recess of a body of the valve, and a compensator wheel supportable for rotation by a recess of the rotatable gate element, the drive element and the compensator wheel being operatively linked such that rotational movement of the drive element is transferred into rotational movement of the gate element by the compensator wheel, and the drive element is provided with an eccentric pin and the compensator wheel is provided with an eccentric hole operatively linked with the eccentric pin.

25. A drive mechanism for a rotatable gate element of a valve, the actuation drive mechanism comprising a drive element supportable for rotation by a first recess of a body of the valve, and a compensator wheel supportable for rotation by a recess of the rotatable gate element, the drive element and the compensator wheel being operatively linked such that rotational movement of the drive element is transferred into rotational movement of the gate element by the compensator wheel, and the drive element is provided with an eccentric hole and the compensator wheel is provided with an eccentric pin operatively linked with the eccentric hole.

* * * * *